US008819347B2

(12) United States Patent
Rodriguez

(10) Patent No.: US 8,819,347 B2
(45) Date of Patent: Aug. 26, 2014

(54) MAILBOX DATA COMMUNICATIONS

(75) Inventor: Christopher R. Rodriguez, Lincoln Park, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 303 days.

(21) Appl. No.: 13/467,663

(22) Filed: May 9, 2012

(65) Prior Publication Data
US 2012/0290797 A1 Nov. 15, 2012

Related U.S. Application Data

(60) Provisional application No. 61/483,961, filed on May 9, 2011.

(51) Int. Cl.
*G06F 12/00* (2006.01)
*H04M 3/53* (2006.01)
*H04L 12/58* (2006.01)

(52) U.S. Cl.
CPC ............... *H04M 3/53* (2013.01); *H04L 51/38* (2013.01); *H04M 2201/36* (2013.01); *H04M 2207/18* (2013.01)

USPC ......................................................... 711/147

(58) Field of Classification Search
None
See application file for complete search history.

(56) References Cited

U.S. PATENT DOCUMENTS

| 7,509,141 | B1 * | 3/2009 | Koenck et al. ............. 455/552.1 |
| 8,744,396 | B2 * | 6/2014 | Laccona et al. ............... 455/403 |
| 2008/0282093 | A1 * | 11/2008 | Hatakeyama ................. 713/190 |
| 2011/0087909 | A1 * | 4/2011 | Kanakogi ..................... 713/322 |
| 2012/0289174 | A1 * | 11/2012 | Horihan et al. .............. 455/90.1 |
| 2013/0097616 | A1 * | 4/2013 | Bickle ........................... 719/315 |
| 2013/0311542 | A1 * | 11/2013 | Arsenault ..................... 709/201 |

* cited by examiner

*Primary Examiner* — Brian Peugh
(74) *Attorney, Agent, or Firm* — Leo Zucker; Daniel J. Long

(57) ABSTRACT

A method of passing message data from a first device to a second device in a software defined radio (SDR) apparatus. A shared memory is defined in the apparatus for access by either one of the first and the second devices. A priority message originating from one of the devices and destined to the other device is loaded into a buffer of the shared memory, and the address of the buffer is passed to the other device. The message in the buffer of the shared memory is then accessed directly from the other device.

4 Claims, 4 Drawing Sheets

EACH REGION CONSISTS OF 64 MESSAGE STORES, EACH
MESSAGE STORE IS 16 kB, WITH A CIRCULAR FIFO.

| REGION | USE | SHARED MEMORY | | |
|---|---|---|---|---|
| | | OWNER | SIZE (MB) | START ADDR |
| 1 | GPP TO DSP | GPP | 1 | 0x80000000 |
| 2 | GPMC TO GPP | GPP | 1 | 0x80100000 |
| 3 | McBSP1 TO GPP | GPP | 1 | 0x80200000 |
| 4 | McBSP2 TO GPP | GPP | 1 | 0x80300000 |
| 5 | McBSP3 TO GPP | GPP | 1 | 0x80400000 |
| 6 | GPP TO GPMC | GPP | 1 | 0x80500000 |
| 7 | GPP TO McBSP1 | GPP | 1 | 0x80600000 |
| 8 | GPP TO McBSP2 | GPP | 1 | 0x80700000 |
| 9 | GPP TO McBSP3 | GPP | 1 | 0x80800000 |
| 10 | DSP TO GPP | DSP | 1 | 0x80900000 |
| 11 | DSP PROGRAM | DSP | 6 | 0x80A00000 |

MAILBOX DATA COMMUNICATIONS

CROSS REFERENCE TO RELATED APPLICATION

This application claims priority under 35 U.S.C. Sec. 119 (e) of U.S. Provisional Patent Application No. 61/483,961 filed May 9, 2011, titled Mailbox Communications Method and incorporated herein by reference in its entirety.

BACKGROUND OF THE INVENTION

1. Field of the Invention

The present invention relates to a method and system for passing data among different devices in a software defined radio architecture.

2. Discussion of the Known Art

In software defined radio (SDR) apparatus, devices such as general purpose processors (GPP), digital signal processors (DSP), and field programmable gate arrays (FPGA) often need to share data with one another. Such sharing is typically performed by way of a commonly shared data bus, or by multiple data busses wherein the devices directly ship data between each other. This results in complex interactions between the devices and hardware architectures. For example, Ground Mobile Radio (GMR) platforms specified by the Joint Tactical Radio System (JTRS) place multiple devices that need to communicate with one another on a single printed circuit board (PCB). Yet, the moving of data between the devices has been found to create an overhead that impacts the overall performance of the radio platform.

Devices including the open multimedia application platform (OMAP) have constructs such as mailboxes that allow very short messages to be sent quickly among the mailboxes. Notwithstanding, there is a need for a less complex and more efficient way to communicate data among various devices in a SDR apparatus, whether the devices are supported on a single or on multiple circuit boards.

SUMMARY OF THE INVENTION

According to the invention, a method of passing message data from a first device to a second device in a software defined radio (SDR) apparatus, includes defining a shared memory in the apparatus for direct access by either one of the first and the second devices, and originating a priority message from one of the devices which message is destined to the other one of the devices. The priority message is loaded into a buffer of the shared memory, and the address of the buffer is passed to the other device. The message in the buffer of the shared memory is then accessed directly from the other device.

According to another aspect of the invention, data is moved efficiently between a field programmable gate array (FPGA), a digital signal processor (DSP), and a general purpose processor (GPP), by using a software defined three port memory in a SDRAM of the GPP.

For a better understanding of the invention, reference is made to the following description taken in conjunction with the accompanying drawing and the appended claims.

BRIEF DESCRIPTION OF THE DRAWING

In the drawing:

FIG. 1B is a table showing a mapping of buffers in a shared memory in FIG. 1A;

DETAILED DESCRIPTION OF THE INVENTION

Figure 1A:
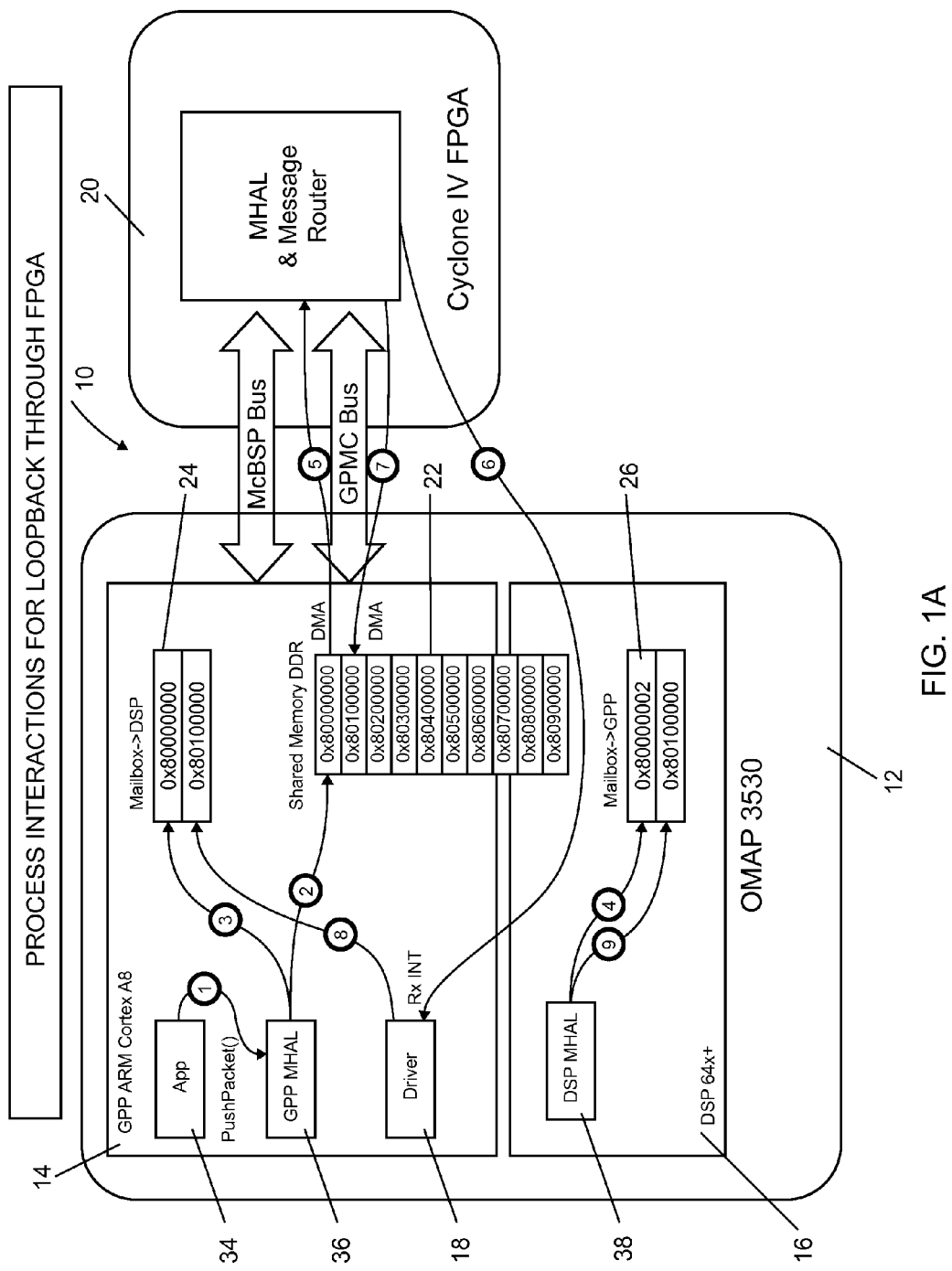
FIG. 1A is a block diagram of a software defined radio apparatus configured according to the invention.

FIG. 1A is a schematic block diagram of a software defined radio (SDR) apparatus 10 that includes an open multimedia application platform (OMAP) 12 (e.g., type 3530) with a general purpose processor (GPP) 14 and a digital signal processor (DSP) 16. The GPP 14 includes an associated set of hardware dedicated for direct memory access (DMA), and driver software 18 that enables the DMA hardware to be controlled. Memory access methods other than DMA could also be used. The apparatus 10 also includes, e.g., a Cyclone IV field programmable gate array (FPGA) 20, and a single defined shared memory structure 22 that can be accessed from any of the devices.

A set of mailboxes 24, 26, are internal to the OMAP 12 but may be defined externally as well. Mailbox 24 at the top of FIG. 1A is associated with the GPP 14 and serves to allow short single word messages to be passed from the GPP to the DSP 16. The GPP 14 includes a customer set of driver software that defines how bits in the mailbox are used. Mailbox 26 at the bottom of FIG. 1A is associated with the DSP 16 and it allows single word messages to be passed to the GPP 14. Both mailboxes 24, 26, include multiple words allowing for multiple messages to be buffered before being read using a first in, first out (FIFO) method. A preferred buffer depth is four, but a wide range of depths may be allowed.

A table 30 in FIG. 1B shows a mapping of buffers in the shared memory 22, including a start address of each buffer, who is allowed to write to the buffer (i.e., the owner), the buffer's intended use, and its size. According to the invention, the shared memory 22 with the buffers 30 may be defined in what is known as a "boot" memory. The boot memory is used at the time of system start up, and then typically remains unused during system operation. One aspect of the invention allows the boot memory to be used for creating buffers to pass messages after the boot process has completed as detailed below, without requiring the boot memory always to do so.

Also shown in FIG. 1A, at the top left, are certain software structures resident on the GPP 14 including applications (APP) 34, and a GPP modem hardware abstraction layer (MHAL) 36. Note that the DSP 16 and the FPGA 20 each have their own resident MHAL interfaces 38, 40, as well.

Figure 2:
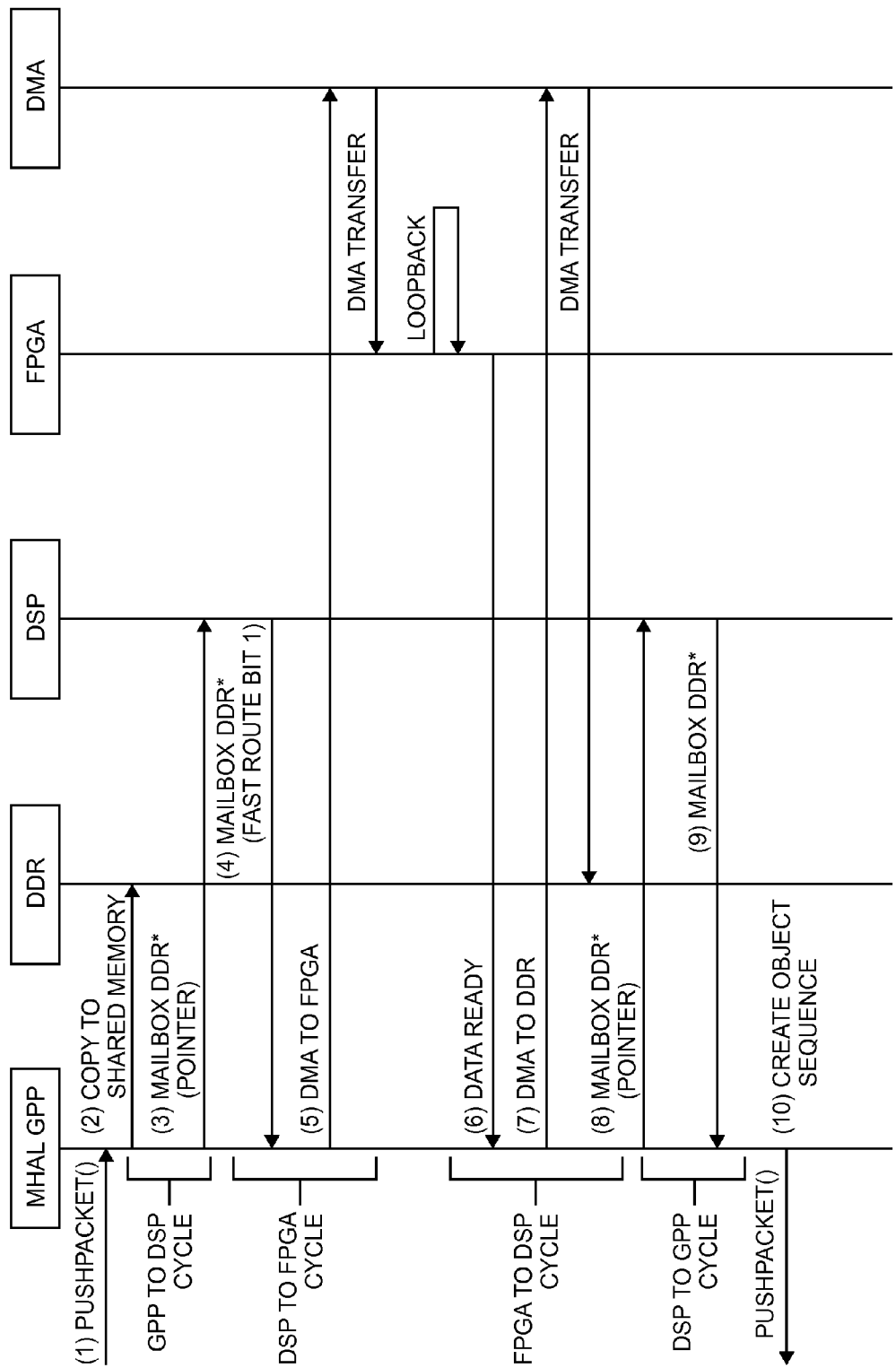
FIG. 2 is a message sequence diagram.

FIG. 2 is a sequence diagram showing an example of the inventive data transfer technique, and is not intended to foreclose an implementation of the invention for other data transfers among devices in the SDR apparatus 10, or in other apparatus.

At the top left of FIG. 2, the application 34 (FIG. 1) generates a Pushpacket( ) command to the MHAL (step 1 in FIGS. 1 and 2). This is a standard command associated with the known common object request broker architecture (CORBA) software, for initiating a transfer of a message from one device to another. In the present example, the application 34 initiates a transfer of a message from the GPP 14 to the DSP 16, to the FPGA, back to the DSP 16 and back to the GPP 14. As such it initiates a loopback of the data.

Figure 3:
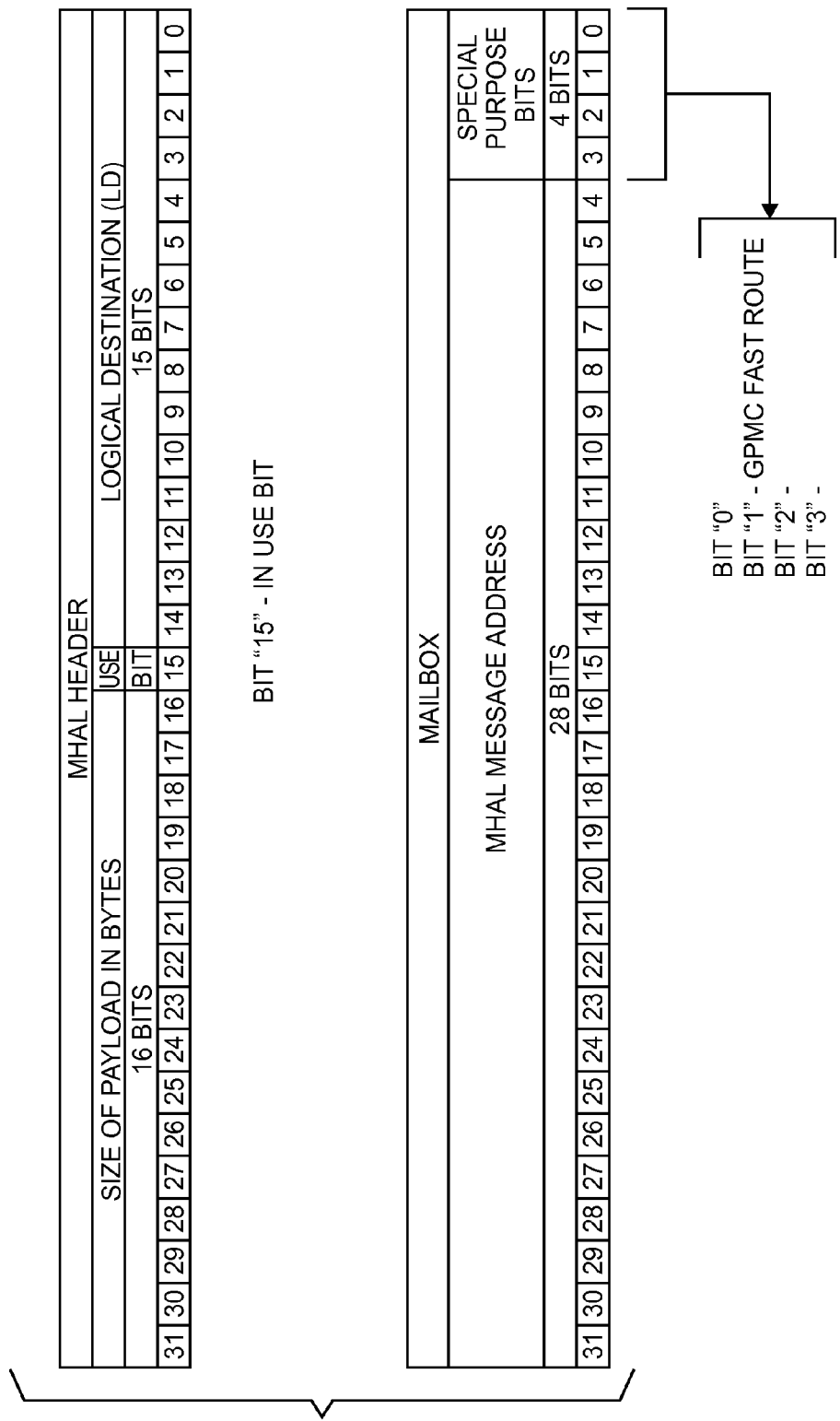
FIG. 3 shows message data formats according to the invention.

After the command is received by the GPP MHAL 36, the MHAL loads the message associated with the command into shared memory in the buffer intended for communications from the GPP 14 to the DSP 16 (step 2). It then loads the address of the buffer with other flags as a short one word message into the mailbox 24 for the DSP (step 3). The DSP 16 reads the mailbox, and based on the logical address in the header (see FIG. 3 for an exemplary set of data formats), recognizes this as a loopback message with normal priority for communications between the DSP 16 and the GPP 14.

Once it reads the mailbox, the DSP 16 has full access to the message in the buffer. Since the message has normal priority, it must be written up into the DSP MHAL 38 and processed. An alternate implementation may provide that if a priority bit in the message is set, the MHAL 38 may be bypassed. Also, some systems might include an extra DMA step to move the message to another memory dedicated for use by the DSP. In a preferred implementation, the DSP 16 operates on the message directly in the shared memory 22.

Recognizing the message as a loopback message, the DSP 16 wishes to move the message to the FPGA 20. During normal operation, all messages must be exchanged through the MHAL interfaces, thereby necessitating that the DSP MHAL 38 pass the present message to the FPGA MHAL 40. Because this can be a very wasteful and time consuming process, driver software developed according to the invention for the mailboxes 24, 26, operates to map the mentioned priority bit into the mailbox messages. The priority bit indicates that the message should be routed directly from the originating device to the destination device without passing through the MHAL interfaces for the devices.

To deliver the message from the DSP 16 directly to the FPGA 20, the DSP must use DMA hardware in the GPP 14 to move the message data from the shared memory 22 into a block of memory provided in the FPGA 20. Accordingly, the DSP 16 sends a message in the mailbox 26 to the GPP 14, indicating (via the logical address) that a message is to be moved from the DSP to the FPGA 20 (step 4). Rather than move the message to a buffer normally used for DSP to FPGA communications, the GPP 14 merely passes the address for the buffer containing the current message (normally used for communication from the GPP to the DSP). This saves a significant amount of time otherwise wasted in copying the message between software and hardware components. In addition, the GPP 14 sets the priority bit to indicate that the message should not be passed up to the MHAL 40, but should be passed directly through the FPGA 20 elsewhere. A DMA then occurs to move the message from the buffer in the shared memory 22 to the block of memory in the FPGA (step 5).

Once the message is in the FPGA 20, the end of the DMA cycle will signify to the FPGA that the message is present. The FPGA 20 then knows from the logical destination (included in the message) to pass the message back to the DSP 16. The FPGA 20 initiates another DMA by asserting a RxINT (step 6) interrupt to a DMA controller driver to move the data from the FPGA 20, to a buffer in the shared memory area allocated for incoming FPGA messages (step 7). When the DMA completes, the DMA driver sends a mailbox message to the DSP 16 indicating the presence of the message, and (based on logical address) what should be done with the message (step 8). The DSP 16 sees that the message needs to go back to the GPP 14 to complete the loopback, so it merely sends a mailbox message with the address of the buffer to the GPP 14, thus completing the loopback process (step 9).

As disclosed herein, instead of using the standard (CORBA) MHAL approach, messages are passed with much greater efficiency among devices in a SDR architecture via a shared memory and mailboxes that are associated with each of the devices.

While the foregoing represents preferred embodiments of the invention, it will be understood by those skilled in the art that various modifications, additions, and changes may be made without departing from the spirit and scope of the invention, and that the invention includes all such modifications and changes as come within the scope of the following claims.

I claim:

1. A method of passing message data from a first device to a second device in a software defined radio (SDR) apparatus, comprising:
    defining a shared memory in the software defined radio (SDR) apparatus for access by either one of the first and the second devices;
    originating a priority message from one of the devices which message is destined to the other one of the devices;
    loading the priority message into a buffer of the shared memory, and passing the address of the buffer to the other device; and
    directly accessing the message in the buffer of the shared memory from the other device.

2. A method according to claim 1, including providing an open multimedia application platform (OMAP) as the first device.

3. A method according to claim 1, including providing a field programmable gate array (FPGA) as the second device.

4. A method according to claim 1, including defining the shared memory from a boot memory associated with the SDR apparatus.

* * * * *